United States Patent
Du

(10) Patent No.: US 12,282,173 B2
(45) Date of Patent: Apr. 22, 2025

(54) DISPLAY MODULE AND AUGMENTED REALITY GLASSES

(71) Applicant: GUANGDONG OPPO MOBILE TELECOMMUNICATIONS CORP., LTD., Dongguan (CN)

(72) Inventor: Peng Du, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 495 days.

(21) Appl. No.: 17/825,986

(22) Filed: May 26, 2022

(65) Prior Publication Data

US 2022/0283441 A1 Sep. 8, 2022

Related U.S. Application Data

(63) Continuation of application No. PCT/CN2020/125974, filed on Nov. 2, 2020.

(30) Foreign Application Priority Data

Nov. 29, 2019 (CN) .......................... 201911204431.9

(51) Int. Cl.
*G02B 27/09* (2006.01)
*G02B 27/01* (2006.01)
(Continued)

(52) U.S. Cl.
CPC ..... *G02B 27/0944* (2013.01); *G02B 27/0101* (2013.01); *G02B 27/0172* (2013.01);
(Continued)

(58) Field of Classification Search
CPC ............ G02B 27/0944; G02B 27/0101; G02B 27/0172; G02B 27/0176; G02B 27/44;
(Continued)

(56) References Cited

U.S. PATENT DOCUMENTS 9,939,647 B2 4/2018 Vallius et al.
11,611,705 B1 * 3/2023 Chen ...................... H04N 23/69
(Continued)

FOREIGN PATENT DOCUMENTS

AU 2008313502 A1 4/2009
CN 101930125 A 12/2010
(Continued)

OTHER PUBLICATIONS

International Search Report and Written Opinion dated Jan. 27, 2021 in International Application No. PCT/CN2020/125974. English translation attached.
(Continued)

*Primary Examiner* — Charles S Chang
(74) *Attorney, Agent, or Firm* — Sheppard, Mullin, Richter & Hampton LLP

(57) ABSTRACT

Provided are a display module and augmented reality glasses, which relate to the technical field of augmented reality. The display module includes: a bracket; and a first
(Continued)

diffractive waveguide and a second diffractive waveguide that are arranged on the bracket, the first diffractive waveguide and the second diffractive waveguide are configured to correspond to eyes of a user in one-to-one correspondence; the first diffractive waveguide includes a first region that has a projection on the bracket, the first region has a first notch at a side thereof close to the second diffractive waveguide, and the first notch faces towards the second diffractive waveguide. This can reduce the volume of the augmented reality glasses and is beneficial to the miniaturized design of the augmented reality glasses.

19 Claims, 4 Drawing Sheets

(51) Int. Cl.
  *G02B 27/44* (2006.01)
  *G06T 19/00* (2011.01)
(52) U.S. Cl.
  CPC ......... *G02B 27/0176* (2013.01); *G02B 27/44* (2013.01); *G06T 19/006* (2013.01); *G02B 2027/0138* (2013.01); *G02B 2027/014* (2013.01); *G02B 2027/0178* (2013.01)
(58) Field of Classification Search
  CPC ...... G02B 2027/0138; G02B 2027/014; G02B 2027/0178
  See application file for complete search history.

(56) References Cited

U.S. PATENT DOCUMENTS

2018/0348524 A1\* 12/2018 Blum ..................... H10K 50/86
2019/0317270 A1 10/2019 Tammela et al.

FOREIGN PATENT DOCUMENTS

| | | |
|---|---|---|
| CN | 204178064 U | 2/2015 |
| CN | 105353517 A | 2/2016 |
| CN | 108681067 A | 10/2018 |
| CN | 108873350 A | 11/2018 |
| CN | 109239842 A | 1/2019 |
| CN | 109313339 A | 2/2019 |
| CN | 109407313 A | 3/2019 |
| CN | 109997063 A | 7/2019 |
| CN | 110082846 A | 8/2019 |
| CN | 110908114 A | 3/2020 |

OTHER PUBLICATIONS

First Office Action from corresponding Chinese Application No. 201911204431.9, dated Jun. 21, 2021. English translation attached.
The Second Office Action from corresponding Chinese Application No. 201911204431.9, dated Jan. 25, 2022. English translation attached.
Rejection Decision from corresponding Chinese Application No. 201911204431.9, dated Jun. 8, 2022. English translation attached.
Extended European Search Report dated Dec. 19, 2022 received in European Patent Application No. EP20891948.0.

\* cited by examiner

DISPLAY MODULE AND AUGMENTED REALITY GLASSES

CROSS-REFERENCES TO RELATED APPLICATIONS

The present application is a continuation of International Patent Application No. PCT/CN2020/125974, filed on Nov. 2, 2020, which claims priority to Chinese Patent Application No. 201911204431.9, titled "DISPLAY MODULE AND AUGMENTED REALITY GLASSES", and filed on Nov. 29, 2019, the entire disclosures of which are incorporated herein by reference.

FIELD

The present disclosure relates to the technical field of augmented reality, and more particularly, to a display module and augmented reality glasses.

BACKGROUND

Augmented Reality (AR) is a technology that integrates the virtual world and the real world. This technology has been widely used in education, games, medical care, Internet of Things, intelligent manufacturing and other fields.

Augmented reality glasses, as a portable device that integrates virtuality and reality, have drawn broad attention of developers and users since their emergence, and have a broad market prospect. A pair of augmented reality glasses includes various sensor devices, display devices, control devices, etc. At present, structural constraints cause the pair of augmented reality glasses to be bulky and clumsy in appearance, which is inconvenient for users to wear.

SUMMARY

According to a first aspect of the present disclosure, a display module is provided, including: a bracket; and a first diffractive waveguide and a second diffractive waveguide that are arranged on the bracket, the first diffractive waveguide and the second diffractive waveguide are configured to correspond to eyes of a user in one-to-one correspondence, the first diffractive waveguide includes a first region that has a projection on the bracket, the first region has a first notch at a side thereof close to the second diffractive waveguide, and the first notch faces towards the second diffractive waveguide.

According to a second aspect of the present disclosure, augmented reality glasses are provided, including the above display module.

DESCRIPTION OF EMBODIMENTS

Figure 1:
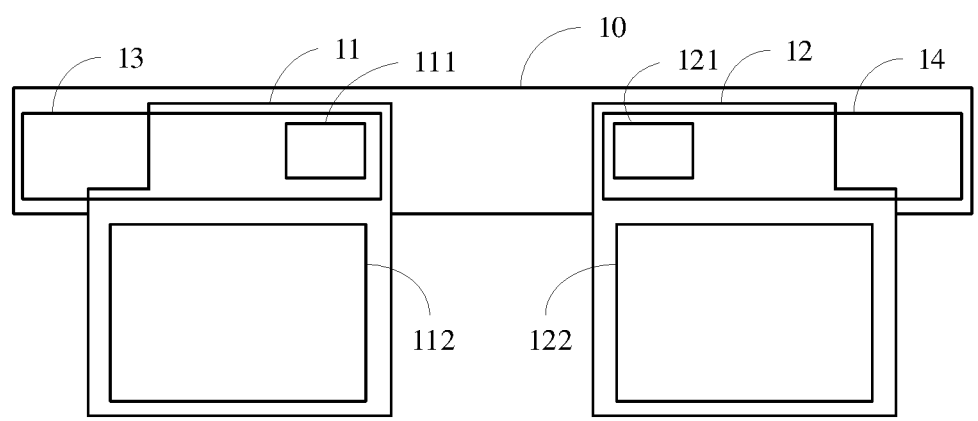
FIG. 1 shows a schematic diagram of a display module applied in augmented reality glasses according to an embodiment of the present disclosure.

Example embodiments will now be described more comprehensively below with reference to the accompanying drawings. However, the example embodiments can be implemented in various forms, and should not be construed as being limited to the embodiments set forth herein. On the contrary, these embodiments are provided to facilitate thorough and comprehensive description of the present disclosure, and fully convey the concepts of the example embodiments to those skilled in the art. Same reference numerals in the figures denote same or similar parts, and thus repeated description of the same reference numerals will be omitted.

Although relative terms such as "on" and "below" are used in the present disclosure to describe the relative relationship of one component to another component in the figures, these terms are used in the present disclosure only for convenience, such as according to the direction of the examples shown in the drawings. It will be appreciated that if the apparatus shown in the figures is turned upside down, the described components that are "on" will become components that are "below". When a certain structure is "on" other structures, it may mean that the certain structure is integrally formed on other structures, or that the certain structure is "directly" arranged on other structures, or that the certain structure is "indirectly" arranged on other structures through another structure.

The terms "a", "one", "the", "said" and "at least one" are used to indicate the presence of one or more elements/components/etc.; the terms "include" and "have" are used to represent an open-ended inclusive meaning and to indicate that additional elements/components/etc. may be present in addition to the listed elements/components/etc.; and the terms "first", "second", "third", " fourth" etc. are used only as markers, not as restrictions on the number of their objects.

In a case of realizing the optical display of augmented reality glasses based on diffractive waveguides, an optical machine needs to project an optical image to entrance pupil gratings of the diffractive waveguides for optical coupling, and the optical image is then output through exit pupil gratings of the diffractive waveguides so that eyes of a user can see the optical image.

It should be noted that the diffractive waveguide described in the present disclosure may be simply referred to as a waveguide, or may be referred to as a lens of the augmented reality glasses.

FIG. 1 shows a schematic diagram of a display module applied in augmented reality glasses according to an embodiment of the present disclosure. A first diffractive waveguide 11 and a second diffractive waveguide 12 may be arranged on a display module bracket 10. The first diffractive waveguide 11 may include a corresponding entrance pupil grating 111 and a corresponding exit pupil grating 112, and the second diffractive waveguide 12 may include a corresponding entrance pupil grating 121 and a corresponding exit pupil grating 122. In addition, image input for the entrance pupil grating 111 may be implemented based on an optical machine 13, and image input for the entrance pupil grating 121 may be implemented based on an optical machine 14.

As can be seen from FIG. 1, the entrance pupil grating 111 and the entrance pupil grating 121 are both arranged at positions close to an inner side of the bracket 10. On the one hand, a region between the optical machine 13 and the optical machine 14 is relatively small, and correspondingly, an available space between the first diffractive waveguide 11 and the second diffractive waveguide 12 is relatively small, and fewer devices can be placed there; on the other hand, since the entrance pupil grating 111 and the entrance pupil grating 121 are arranged at the inner side of the bracket 10, the corresponding optical machines and other optical elements need to extend to the inner side of the bracket to cooperate with the entrance pupil gratings to present an image. Due to the large size of the optical machines and other optical elements, the augmented reality glasses are relatively heavy. Therefore, the structure of the display module shown in FIG. 1 is not conducive to the miniaturization of the augmented reality glasses.

In view of this, the present disclosure provides a new display module, which can reduce the volume and weight of the augmented reality glasses.

It should be understood that the display module provided by the present disclosure can generally be applied in the augmented reality glasses. However, it is not limited to this, and other devices implementing augmented reality can also be constructed based on the display module, which is not limited in the present disclosure.

Figure 2:
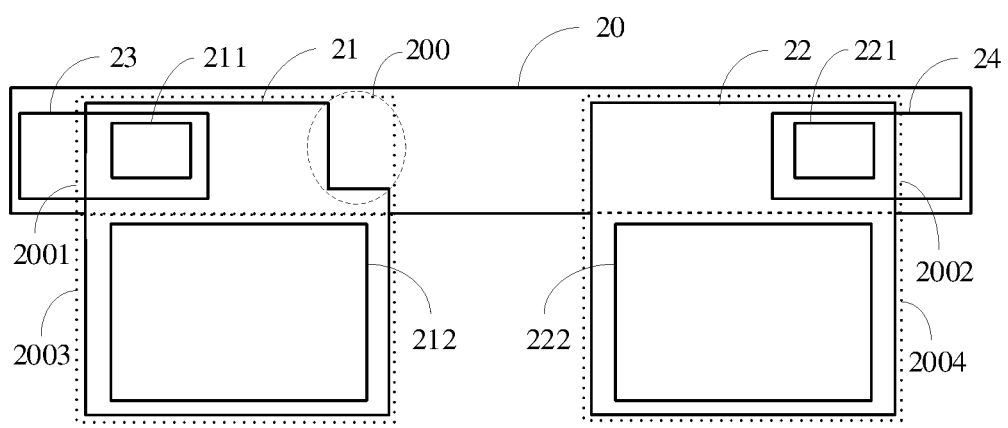
FIG. 2 shows a schematic diagram of a display module according to a first embodiment of the present disclosure.

FIG. 2 shows a schematic diagram of a display module according to a first embodiment of the present disclosure. Referring to FIG. 2, the display module may include a bracket 20, and a first diffractive waveguide 21 and a second diffractive waveguide 22 that are arranged on the bracket 20. In a case of applying the diffractive waveguide principle to realize the image display of the augmented reality glasses, the diffractive waveguide described in the present disclosure can be regarded as a lens of the augmented reality glasses. In addition, the first diffractive waveguide 21 and the second diffractive waveguide 22 are usually fixed on the bracket 20, however, in an embodiment of the present disclosure, the first diffractive waveguide 21 and the second diffractive waveguide 22 may slide on the bracket 20. It should be noted that the first diffractive waveguide 21 and the second diffractive waveguide 22 are configured to correspond to eyes of a user (who wears the augmented reality glasses) in one-to-one correspondence.

Referring to FIG. 2, a region of the first diffractive waveguide 21 having a projection on the bracket 20 may be taken as a first region 2001, that is, the first diffractive waveguide 21 may include the first region 2001 that has a projection on the bracket 20. As can be seen from FIG. 2, the first region 2001 has a first notch at a side thereof close to the second diffractive waveguide 22, that is, as for the first diffractive waveguide 21, the first notch 200 is close to a center of the bracket 20. In addition, the first notch 200 faces towards the second diffractive waveguide 22.

Correspondingly, a region of the second diffractive waveguide 22 having a projection on the bracket 20 can be taken as a second region 2002. However, in the first embodiment of the present disclosure, the second diffractive waveguide 22 does not have a notch similar to that of the first diffractive waveguide 21. In addition, it should be noted that the present disclosure does not limit the relative positional relationship between the first diffractive waveguide and the second diffractive waveguide. For example, in an embodiment, taking the eyes as the standard after wearing, the lens on the right can be used as the first diffractive waveguide, and the lens on the left can be used as the second diffractive waveguide. In such a case, the lens on the right has a notch, while the lens on the left does not have a notch.

In addition, the first diffractive waveguide 21 includes a first entrance pupil grating 211 and a first exit pupil grating 212. The first entrance pupil grating 211 is arranged on a side of the first region 2001 facing away from the second diffractive waveguide 22 and configured to obtain an optical image for transmission of the optical image on the first diffractive waveguide 21. The first exit pupil grating 212 is arranged in a region of the first diffractive waveguide 21 other than the first region 2001. Referring to FIG. 2, the region other than the first region 2001 is denoted as a third region 2003, that is, the first exit pupil grating 212 is arranged in the third region 2003. The first exit pupil grating 212 may be configured to receive the optical image transmitted on the first diffractive waveguide 21 and output the optical image for human eye perception.

An optical image may be projected to the first entrance pupil grating 211 using an optical machine. That is to say, the display module may further include a first optical machine 23 arranged between the bracket 20 and the first entrance pupil grating 211, corresponding to the first entrance pupil grating 211, and configured to transmit the optical image. In addition, the display module includes a first light guide element that may be arranged between the first optical machine 23 and the first entrance pupil grating 211 and configured to project the optical image transmitted by the first optical machine 23 to the first entrance pupil grating 211. Specifically, the first light guide element can adjust the optical image transmitted by the first optical machine 23 by, for example, 90° for inputting of the optical image into the first entrance pupil grating 211. The first light guide element can be, for example, a prism.

Comparing FIG. 1 and FIG. 2, it can be seen that since the first entrance pupil grating 211 is disposed away from the center of the bracket 20, volumes of the optical machine and the light guide element corresponding to the first entrance pupil grating 211 can be set smaller, which in turn helps reduce the weight of the augmented reality glasses.

Regarding the configuration related to the second diffractive waveguide 22 in FIG. 2, specifically, the second diffractive waveguide 22 includes a second entrance pupil grating 221 and a second exit pupil grating 222. The second entrance pupil grating 221 is arranged on a side of the second region 2002 facing away from the first diffractive waveguide 21 and configured to obtain the optical image for transmission of the optical image on the second diffractive waveguide 22. The second exit pupil grating 222 is arranged in a region of the second diffractive waveguide 22 other than the second region 2002. Referring to FIG. 2, the region other than the second region 2002 is denoted as a fourth region 2004, that is, the second exit pupil grating 222 is arranged in the fourth region 2004. The second exit pupil grating 222 may be configured to receive the optical image transmitted on the second diffractive waveguide 22 and output the optical image for human eye perception. The optical image output by the second exit pupil grating 222 and the optical image output by the first exit pupil grating 212 are usually the same image.

An optical image may be projected to the second entrance pupil grating 221 using another optical machine. That is to say, the display module may further include a second optical machine 24 arranged between the bracket 20 and the second entrance pupil grating 221, corresponding to the second entrance pupil grating 221, and configured to transmit the optical image. In addition, the display module includes a second light guide element that may be arranged between the second optical machine 24 and the second entrance pupil grating 221 and configured to project the optical image transmitted by the second optical machine 24 to the second entrance pupil grating 221. Specifically, the second light guide element can adjust the optical image transmitted by the second optical machine 24 by, for example, 90° for inputting of the optical image into the second entrance pupil grating 221. The second light guide element can also be, for example, a prism.

Similarly, since the second entrance pupil grating 221 is disposed away from the center of the bracket 20, the optical machine and the light guide element corresponding to the second entrance pupil grating 221 are small in volume, thereby helping to reduce the weight of the augmented reality glasses.

In the above first embodiment, since the first diffractive waveguide 21 has a first notch 200, an available region of the bracket between the first diffractive waveguide 21 and the second diffractive waveguide 22 is increased and other devices or modules can be disposed on this region. Taking a camera unit as an example, the camera unit can be arranged on the bracket 20 at a position corresponding to a target region, and the target region includes the first notch 200 and a region between the first notch 200 and the second diffractive waveguide 22.

In addition, the first entrance pupil grating 211 is arranged on a side facing away from the second diffractive waveguide 22, and the second entrance pupil grating 221 is arranged on a side facing away from the first diffractive waveguide 21, thereby increasing the region between the two optical machines, and some electronic components can also be deployed in this increased region in order to further reduce the volume of the augmented reality glasses. For example, if the size permits, the camera unit can also be arranged between the two optical machines.

Figure 3:
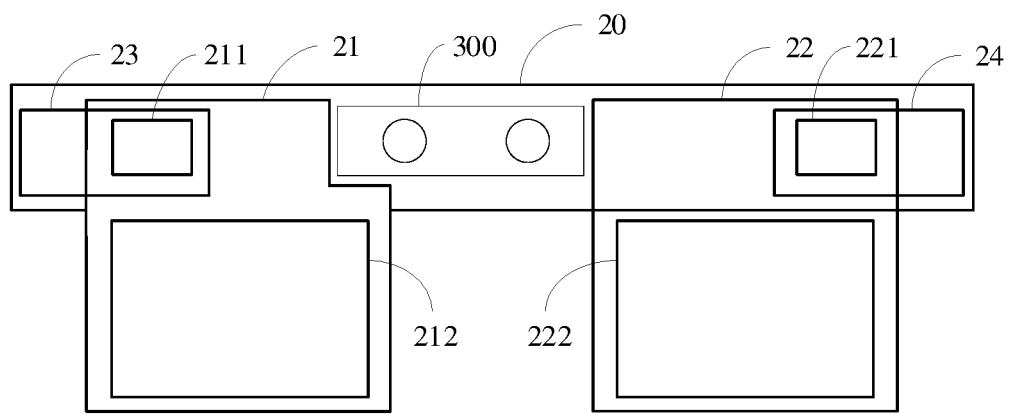
FIG. 3 shows a schematic diagram of the display module provided with a camera unit according to the first embodiment of the present disclosure.

As shown in FIG. 3, a camera unit 300 can be disposed in this region, so as to obtain image information of a current scene in real time, and perform the fusion of virtuality and reality. The camera unit described in the present disclosure includes one or more of various environment detection cameras, such as Time-Of-Flight (TOF) cameras, RGB cameras, etc., which are configured to implement pose tracking and positioning.

In order to further increase the available region between the first diffractive waveguide and the second diffractive waveguide, in a second embodiment of the present disclosure, a solution in which the second diffractive waveguide has a notch is provided.

Figure 4:
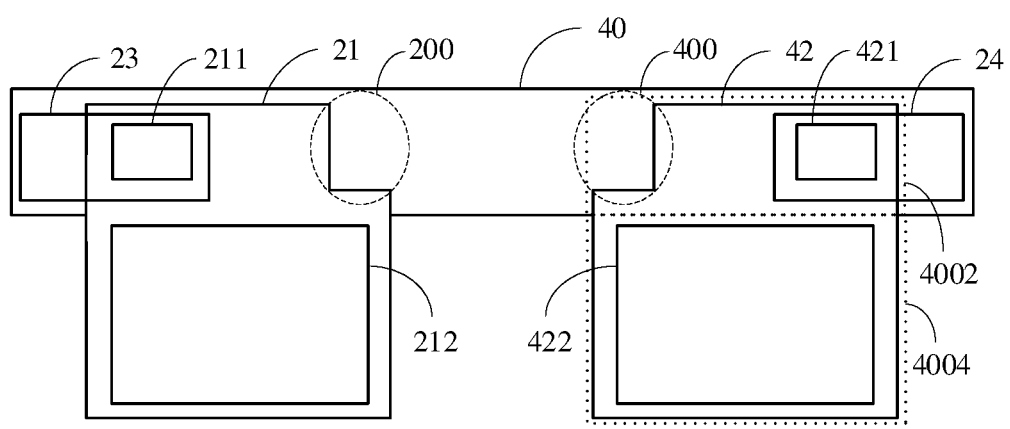
FIG. 4 shows a schematic diagram of a display module according to a second embodiment of the present disclosure.

Referring to FIG. 4, the settings of the first diffractive waveguide and the corresponding optical machine are the same as those shown in FIG. 2, and will not be described again.

The difference from FIG. 2 is that the second diffractive waveguide 42 shown in FIG. 4 includes a second region 4002 that has a projection on a bracket 40, the second region 4002 has a second notch 400 on a side thereof close to the first diffractive waveguide 21, and the second notch 400 faces towards the first diffractive waveguide 21. It should be noted that although FIG. 4 shows a configuration structure in which the first notch 200 and the second notch 400 are arranged oppositely to each other, that is to say, the first notch 200 may be symmetrical to the second notch 400, however, it should be understood that the first notch 200 may be asymmetrical to the second notch 400, and the sizes of the notches may also be different.

In this case, the second diffractive waveguide 42 includes a second entrance pupil grating 421 and a second exit pupil grating 422. The second entrance pupil grating 421 is arranged on a side of the second region 4002 facing away from the first diffractive waveguide 21 and configured to obtain an optical image for transmission of the optical image on the second diffractive waveguide 42. The second exit pupil grating 422 is arranged in a fourth region 4004 of the second diffractive waveguide 42 other than the second region and configured to receive the optical image transmitted on the second diffractive waveguide 42 and output the optical image for human eye perception.

An optical image may be projected to the second entrance pupil grating 421 using a second optical machine 24. That is to say, the display module may further include a second optical machine 24 arranged between the bracket 40 and the second entrance pupil grating 421, corresponding to the second entrance pupil grating 421, and configured to transmit the optical image. In addition, the display module includes a second light guide element that may be arranged between the second optical machine 24 and the second entrance pupil grating 421 and configured to project the optical image transmitted by the second optical machine 24 to the second entrance pupil grating 421. Specifically, the second light guide element can adjust the optical image transmitted by the second optical machine 24 by, for example, 90° for inputting of the optical image into the second entrance pupil grating 421. The second light guide element can also be, for example, a prism.

Since the second entrance pupil grating 421 is disposed away from the center of the bracket 40, the optical machine and the light guide element corresponding to the second entrance pupil grating 421 are relatively small in volume, which is beneficial to reduce the weight of the augmented reality glasses.

In the second embodiment of the present disclosure, since the first diffractive waveguide 21 has a first notch 200 and the second diffractive waveguide 42 has a second notch 400, the available region of the bracket between the first diffractive waveguide 21 and the second diffractive waveguide 42 is greatly increased and other devices or modules can be disposed in this region. Taking the camera unit as an example, the camera unit can be arranged on the bracket 40 at a position corresponding to a target region, and the target region includes the first notch 200, the second notch 400, and a region between the first notch 200 and the second notch 400.

Figure 5:
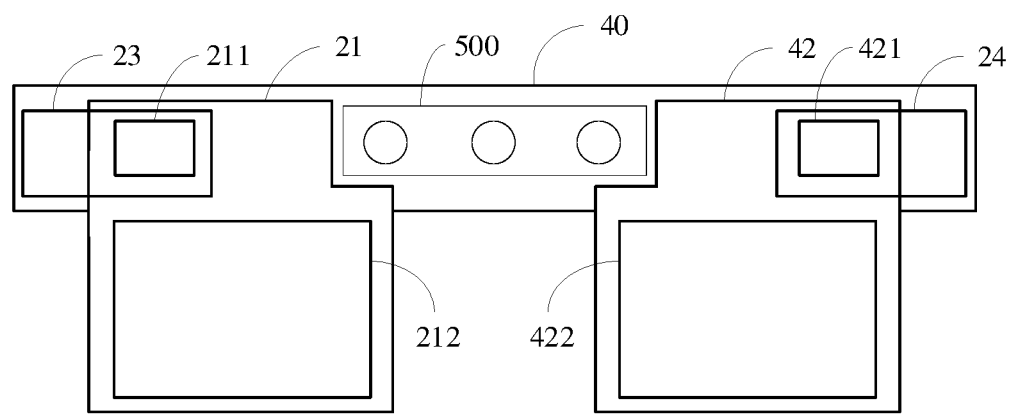
FIG. 5 shows a schematic diagram of the display module provided with a camera unit according to the second embodiment of the present disclosure.

As shown in FIG. 5, a camera unit 500 can be disposed in this region, so as to obtain image information of a current scene in real time, and perform the fusion of virtuality and reality.

As can be seen from FIGS. 3 and 5, due to the existence of both the first and second notches, the available region between the first diffractive waveguide and the second diffractive waveguide is further increased, and more cameras can be disposed.

In addition, the first entrance pupil grating 211 is arranged on a side facing away from the second diffractive waveguide 42, and the second entrance pupil grating 421 is arranged on a side facing away from the first diffractive waveguide 21, thereby increasing the region between the two optical machines, and some electronic components can also be deployed in this increased region in order to further reduce the volume of the augmented reality glasses. For example, if the size permits, the camera unit can also be arranged between the two optical machines.

Figure 6:
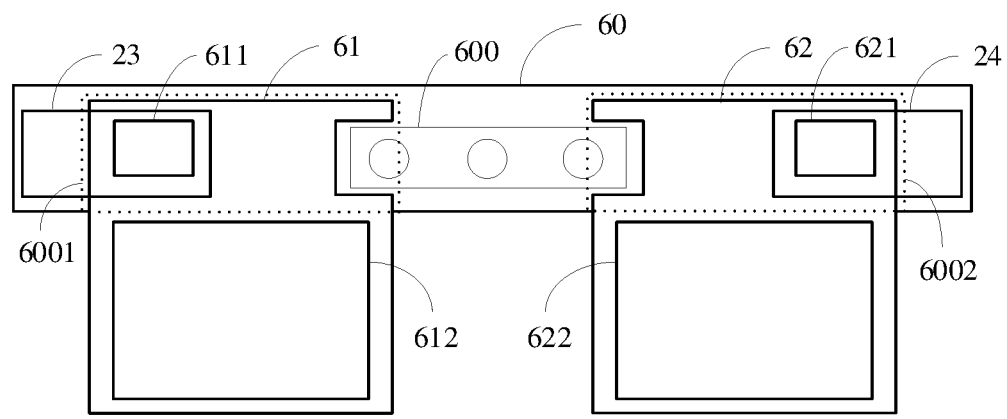
FIG. 6 shows a schematic diagram of a display module provided with a camera unit according to a third embodiment of the present disclosure.

FIG. 6 shows a schematic diagram of a display module provided with a camera unit according to a third embodiment of the present disclosure. Referring to FIG. 6, on a side of a first region 6001 of a first diffractive waveguide 61 close to a second diffractive waveguide 62, a first notch may be configured in a concave shape. On a side of a second region 6002 of the second diffractive waveguide 62 close to the first diffractive waveguide 61, a second notch may also be configured in a concave shape. A camera unit 600 may be disposed in the first notch, the second notch, and a region between the first notch and the second notch.

In addition, the first diffractive waveguide 61 may include a first entrance pupil grating 611 and a first exit pupil grating 612. Corresponding to the first entrance pupil grating 611, a first optical machine 23 and a first light guide element can be provided on the bracket 60. The second diffractive waveguide 62 may include a second entrance pupil grating 621 and a second entrance pupil grating 622. Corresponding to the second entrance pupil grating 621, a second optical machine 24 and a second light guide element can be provided on the bracket 60.

In addition, referring to FIG. 6, the first entrance pupil grating 611 is arranged on a side facing away from the second diffractive waveguide 62, and the second entrance pupil grating 621 is arranged on a side facing away from the first diffractive waveguide 61, thereby increasing the region between the two optical machines, and some electronic components can also be deployed in this increased region in order to further reduce the volume of the augmented reality glasses. For example, if the size permits, the camera unit can also be arranged between the two optical machines.

Figure 7:
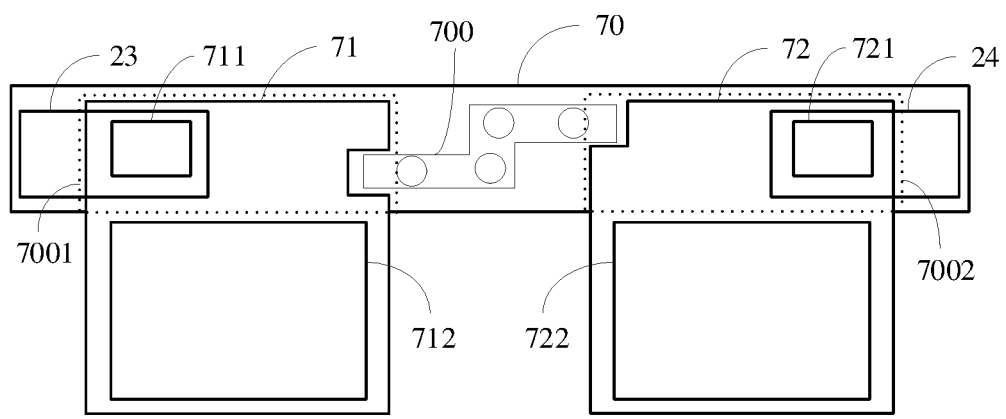
FIG. 7 shows a schematic diagram of a display module provided with a camera unit according to a fourth embodiment of the present disclosure.

FIG. 7 shows a schematic diagram of a display module provided with a camera unit according to a fourth embodiment of the present disclosure. Referring to FIG. 7, on a side of a first region 7001 of a first diffractive waveguide 71 close to a second diffractive waveguide 72, a first notch may be configured in a concave shape. On a side of a second region 7002 of a second diffractive waveguide 72 close to the first diffractive waveguide 71, a second notch may be set as the second notch 400 shown in FIG. 4. A camera unit 700 may be disposed in the first notch, the second notch, and a region between the first notch and the second notch. In the embodiment shown in FIG. 7, the first notch is asymmetrical to the second notch.

In addition, the first diffractive waveguide 71 may include a first entrance pupil grating 711 and a first exit pupil grating 712. Corresponding to the first entrance pupil grating 711, a first optical machine 23 and a first light guide element can be provided on the bracket 70. The second diffractive waveguide 72 may include a second entrance pupil grating 721 and a second entrance pupil grating 722. Corresponding to the second entrance pupil grating 721, a second optical machine 24 and a second light guide element can be provided on the bracket 70.

In addition, referring to FIG. 7, the first entrance pupil grating 711 is arranged on a side facing away from the second diffractive waveguide 72, and the second entrance pupil grating 721 is arranged on a side facing away from the first diffractive waveguide 71, thereby increasing a region between the two optical machines, and some electronic components can also be deployed in this increased region in order to further reduce the volume of the augmented reality glasses. For example, if the size permits, the camera unit can also be arranged between the two optical machines.

Figure 8:
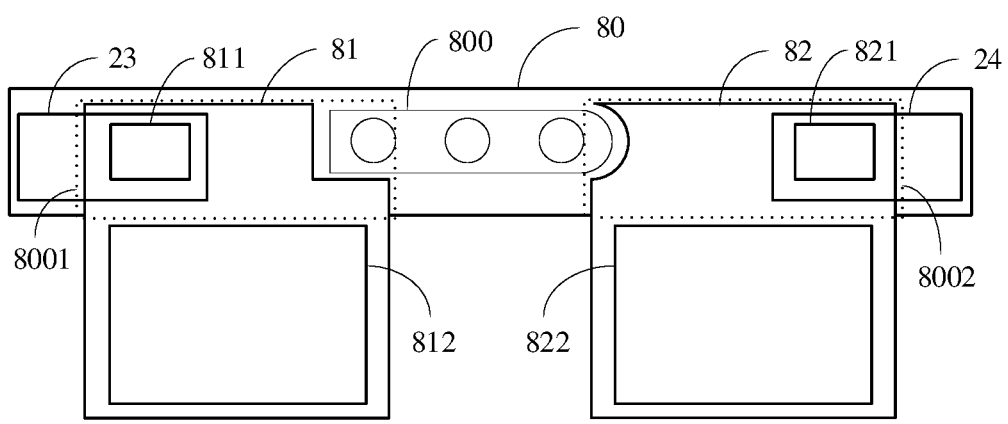
FIG. 8 shows a schematic diagram of a display module provided with a camera unit according to a fifth embodiment of the present disclosure.

FIG. 8 shows a schematic diagram of a display module provided with a camera unit according to a fifth embodiment of the present disclosure. Referring to FIG. 8, the first notch and the second notch have different shapes. Specifically, on a side of a first region 8001 of a first diffractive waveguide 81 close to a second diffractive waveguide 82, the first notch may be configured in a rectangle shape in a top view. On a side of a second region 8002 of the second diffractive waveguide 82 close to the first diffractive waveguide 81, the second notch may be configured in a semicircle shape in a top view. A camera unit 800 may be disposed in the first notch, the second notch, and a region between the first notch and the second notch.

In addition, the first diffractive waveguide 81 may include a first entrance pupil grating 811 and a first exit pupil grating 712. Corresponding to the first entrance pupil grating 811, a first optical machine 23 and a first light guide element can be provided on the bracket 80. The second diffractive waveguide 82 may include a second entrance pupil grating 821 and a second entrance pupil grating 822. Corresponding to the second entrance pupil grating 821, a second optical machine 24 and a second light guide element can be provided on the bracket 80.

In addition, referring to FIG. 8, the first entrance pupil grating 811 is arranged on a side facing away from the second diffractive waveguide 82, and the second entrance pupil grating 821 is arranged on a side facing away from the first diffractive waveguide 81, thereby increasing a region between the two optical machines, and some electronic components can also be deployed in this increased region in order to further reduce the volume of the augmented reality glasses. For example, if the size permits, the camera unit can also be arranged between the two optical machines.

It should be noted that, in the above embodiments, the camera unit is taken as an example to describe the application of the notch set forth in the present disclosure. However, for example, an image processing chip, a control button, etc. can also be configured in the notch region. This is not particularly limited in the exemplary embodiments. In addition, it can also be seen from the above embodiments that the present disclosure does not specifically limit the shape and position of the notch on the diffractive waveguide.

In addition, in each of the above embodiments, the bracket may be strip-shaped. In order to be more similar to the glasses daily worn by the user, usually the first diffractive waveguide and the second diffractive waveguide may be mirrored with respect to each other relative to a center line of the bracket. It is easy to understand that the center line mentioned here is perpendicular to a length direction of the bracket.

Further, the present disclosure also provides an augmented reality glasses including the above display module.

According to an exemplary embodiment of the present disclosure, the augmented reality glasses further include a frame, and the display module is detachably arranged on the frame. The purpose of being detachable is that for scenarios with different image processing requirements, only the display module is replaced, and the same frame can be used to save material costs.

In addition, the augmented reality glasses may further include some control buttons, processing chips, storage units, etc., for example, some control buttons may be arranged on a leg, the leg and the frame being formed into one piece.

The augmented reality glasses are constructed using the display module according to the exemplary embodiment of the present disclosure. On the one hand, due to the provision of the notch, the available space between the diffractive waveguides is increased, and devices such as the camera unit can be disposed, and the space is effectively utilized, which is beneficial to reduce the volume of augmented reality glasses; on the other hand, since the entrance pupil gratings of the diffractive waveguides are disposed at positions close to two sides of the display module, the sizes of the corresponding optical machines and light guide elements are also greatly reduced, reducing the weight of augmented reality glasses. In conclusion, the use of the display module of the exemplary embodiment of the present disclosure contributes to the miniaturized design of the augmented reality glasses and is more convenient for users to wear.

Other embodiments of the present disclosure will be readily contemplated by those skilled in the art upon consideration of the description and practice of the disclosure disclosed herein. This application is intended to cover any variations, uses, or adaptations of the present disclosure that follow the general principles of the present disclosure and include common knowledge or techniques in the technical field not disclosed by the present disclosure. The description and examples are to be regarded as exemplary only, with the true scope and essence of the disclosure being indicated by the appended claims.

It is to be understood that the present disclosure is not limited to the precise structures described above and illustrated in the accompanying drawings, and that various modifications and changes may be made without departing from the scope thereof. The scope of the present disclosure is limited only by the appended claims.

What is claimed is:

1. A display module, comprising:
    a bracket; and
    a first diffractive waveguide and a second diffractive waveguide that are arranged on the bracket, wherein the first diffractive waveguide and the second diffractive waveguide are configured to correspond to eyes of a user in one-to-one correspondence;
    wherein the first diffractive waveguide comprises a first region that has a projection on the bracket, the first region has a first notch at a side thereof close to the second diffractive waveguide, and the first notch faces towards the second diffractive waveguide;
    the second diffractive waveguide comprises a second region that has a projection on the bracket, the second region has a second notch on a side thereof close to the first diffractive waveguide, and the second notch faces towards the first diffractive waveguide; and
    the first notch is asymmetrical to the second notch.

2. The display module according to claim 1, further comprising:
    a camera unit arranged on the bracket at a position corresponding to a target region, the target region comprising the first notch and a region between the first notch and the second diffractive waveguide.

3. The display module according to claim 2, further comprising:
    an image processing chip arranged on the bracket at the position corresponding to the target region.

4. The display module according to claim 1, wherein the first notch and the second notch are disposed oppositely to each other.

5. The display module according to claim 4, further comprising:
    a camera unit arranged on the bracket at a position corresponding to a target region, the target region comprising the first notch, the second notch, and a region between the first notch and the second notch.

6. The display module according to claim 5, further comprising:
    an image processing chip arranged on the bracket at the position corresponding to the target region.

7. The display module according to claim 1, wherein each of the first notch and the second notch is in a concave shape.

8. The display module according to claim 1, wherein the first notch and the second notch have different shapes.

9. The display module according to claim 1, wherein the first diffractive waveguide comprises:
    a first entrance pupil grating arranged on a side of the first region facing away from the second diffractive waveguide, and configured to obtain an optical image for transmission of the optical image on the first diffractive waveguide; and
    a first exit pupil grating arranged in a region of the first diffractive waveguide other than the first region and configured to receive the optical image transmitted on the first diffractive waveguide and output the optical image for human eye perception.

10. The display module according to claim 9, further comprising:
    a first optical machine arranged between the bracket and the first entrance pupil grating, corresponding to the first entrance pupil grating, and configured to transmit the optical image; and
    a first light guide element arranged between the first optical machine and the first entrance pupil grating and configured to project the optical image transmitted by the first optical machine to the first entrance pupil grating.

11. The display module according to claim 10, wherein the first light guide element is configured to adjust the optical image transmitted by the first optical machine by 90° for inputting of the optical image into the first entrance pupil grating.

12. The display module according to claim 10, wherein the second diffractive waveguide comprises:
    a second entrance pupil grating arranged on a side of the second region facing away from the first diffractive waveguide and configured to obtain the optical image for transmission of the optical image on the second diffractive waveguide; and
    a second exit pupil grating arranged in a region of the second diffractive waveguide other than the second region, and configured to receive the optical image transmitted on the second diffractive waveguide and output the optical image for human eye perception.

13. The display module according to claim 12, further comprising:
    a second optical machine arranged between the bracket and the second entrance pupil grating, corresponding to the second entrance pupil grating, and configured to transmit the optical image; and
    a second light guide element arranged between the second optical machine and the second entrance pupil grating, and configured to project the optical image transmitted by the second optical machine to the second entrance pupil grating.

14. The display module according to claim 13, wherein the second light guide element is configured to adjust the optical image transmitted by the second optical engine by 90° for inputting of the optical image into the second entrance pupil grating.

15. The display module according to claim 1, wherein the bracket is strip-shaped, the first diffractive waveguide and the second diffractive waveguide are mirrored with respect to each other relative to a center line of the bracket, and the center line is perpendicular to a length direction of the bracket.

16. Augmented reality glasses, comprising the display module according to claim 1.

17. The augmented reality glasses according to claim 16, further comprising:
a frame,
wherein the display module is detachably arranged on the frame.

18. The augmented reality glasses according to claim 17, further comprising:
a control button arranged on a leg, the leg and the frame being formed into one piece.

19. A display module, comprising:
a bracket; and
a first diffractive waveguide and a second diffractive waveguide that are arranged on the bracket, wherein the first diffractive waveguide and the second diffractive waveguide are configured to correspond to eyes of a user in one-to-one correspondence;
wherein the first diffractive waveguide comprises a first region that has a projection on the bracket, the first region has a first notch at a side thereof close to the second diffractive waveguide, and the first notch faces towards the second diffractive waveguide;
the second diffractive waveguide comprises a second region that has a projection on the bracket, the second region has a second notch on a side thereof close to the first diffractive waveguide, and the second notch faces towards the first diffractive waveguide; and
the first notch and the second notch have different shapes.

* * * * *